United States Patent [19]

Merman

[11] 3,946,913
[45] Mar. 30, 1976

[54] GRANULATED MATERIAL DISPENSER

[76] Inventor: Richard J. Merman, 200 Rochelle Ave., Philadelphia, Pa. 19128

[22] Filed: Feb. 19, 1974

[21] Appl. No.: 443,382

Related U.S. Application Data

[63] Continuation-in-part of Ser. No. 372,810, June 22, 1973, abandoned.

[52] U.S. Cl. ............................. 222/453; 222/457
[51] Int. Cl.² ................................. G01F 11/26
[58] Field of Search ........... 222/203, 319, 322, 339, 222/340, 341, 353, 354, 355, 361, 362, 386.5, 409, 425, 445, 444, 447, 448, 449, 511, 518, 559

[56] References Cited
UNITED STATES PATENTS

| | | | |
|---|---|---|---|
| 1,640,583 | 8/1927 | Steinruck | 222/457 |
| 3,073,490 | 1/1963 | Dahl et al. | 222/449 X |
| 3,391,833 | 7/1968 | Plura | 222/203 X |

*Primary Examiner*—Robert B. Reeves
*Assistant Examiner*—Larry H. Martin
*Attorney, Agent, or Firm*—Frank J. Benasutti

[57] ABSTRACT

A device for dispensing particulate or granulated material, comprises a container having sloped walls for retaining the material and feeding it to a plunger mechanism which can be actuated manually to discharge a portion of the material from the container. The plunger is disposed to move horizontally within an expandible sheath thereby permitting movement through the material.

2 Claims, 4 Drawing Figures

GRANULATED MATERIAL DISPENSER

CROSS-REFERENCE TO RELATED APPLICATION

This application is a continuation-in-part of my prior copending application Ser. No. 372,810 now abandoned, filed June 22, 1973, which is incorporated herein by reference, and discloses and claims, in part, the material disclosed and claimed in said prior application.

BACKGROUND OF THE INVENTION

This invention relates to material dispensers and, more particularly, to a dry food material dispenser, such as a sugar dispenser.

In the prior art, dispensing food matter, such as sugar, to the public in a sanitary way in individual portions, has been fraught with problems. Open containers are generally considered to be unsanitary. Ofter, sugar is packaged in individual paper containers for this very reason. While small quantities of sugar can be placed in individual hand-held containers, I know of no commercially available dispenser which can retain a large quantity of sugar for dispensing individual portions. This is, no doubt, due to the fact that a large quantity of sugar which sits in a container overnight has a tendency to cake and this quantity, when mechanically vibrated, for example, by opening the dispenser, will closely and tightly pack.

Apparently, this caking occurs because the sugar deliquesces on exposure to moisture in the atmosphere and then hardens into an almost concrete-like mass. This exposure occurs initially at the openings into the container and thus, if a container sits overnight, it becomes difficult and sometimes impossible to dispense sugar through the opening. Again, it is to be emphasized that we are talking here about large capacity containers rather than small containers which can be inverted in order to pour the sugar from the container through a small opening. Such small capacity containers obviously have neither the packing problem nor the caking problem since the sugar does not lie against the opening when in storage. Of course, even a small container will tend to cake if the sugar is left for a considerable length of time. Generally speaking, such small containers do not have any means for breaking up the cake of sugar short of removing the cap and inserting a utensil into the mass of sugar.

I have attempted, unsuccessfully, to solve the problems of dispensing the sugar in individual portions by using a manually actuated plunger or piston. Such a system will not work due to frictional forces and packing. The packing is caused by vibrations of the mechanism settling the particulate matter against the piston causing such friction as to totally prevent movement; thus making a hand operated dispenser impossible.

Furthermore, a system utilizing a piston-actuated diaphragm such as that shown in the G. Plura U.S. Pat. No. 3,391,833 would be unsuitable in a manual sugar dispenser. For one thing, the short stroke enlarged faced diaphragm would require tremendous force. More importantly, such a device does not move through the particulate matter, but rather attempts to displace it. This would be totally impracticable when dealing with a material which forms a hard concrete-like cake, such as sugar.

SUMMARY OF THE INVENTION

It is an object of this invention to overcome the problems of the prior art as set forth above, and in addition, to provide an efficient means of storing a large quantity of sugar and then dispensing it manually on a regular basis in individual portions, particularly for use in cups of coffee, tea and the like.

In furtherance of this object, I have provided a device having a gravity feed container for the particulate matter, supplying as a means to eliminate friction a piston retained in an expansible sheath. The piston is disposed to move horizontally and the sheath expands with the movement of the piston and conforms to the longitudinally extending surfaces of the piston; in effect forming an enlarged piston of uniform cross section. The sheath is in effect a dry lubricant which allows the piston to move through the material. Since it conforms to the configuration of the piston there is no vertical force applied in an effort to displace material. On actuation of the piston individual protions of particulate matter can be dispensed from the container.

In the preferred embodiment of this invention a shield is provided automatically closing the exit from the container for sanitary purposes.

The above object and other objects of this invention will become apparent from the following description with reference to the accompanying drawings.

DESCRIPTION OF THE PREFERRED EMBODIMENT

Figure 1:
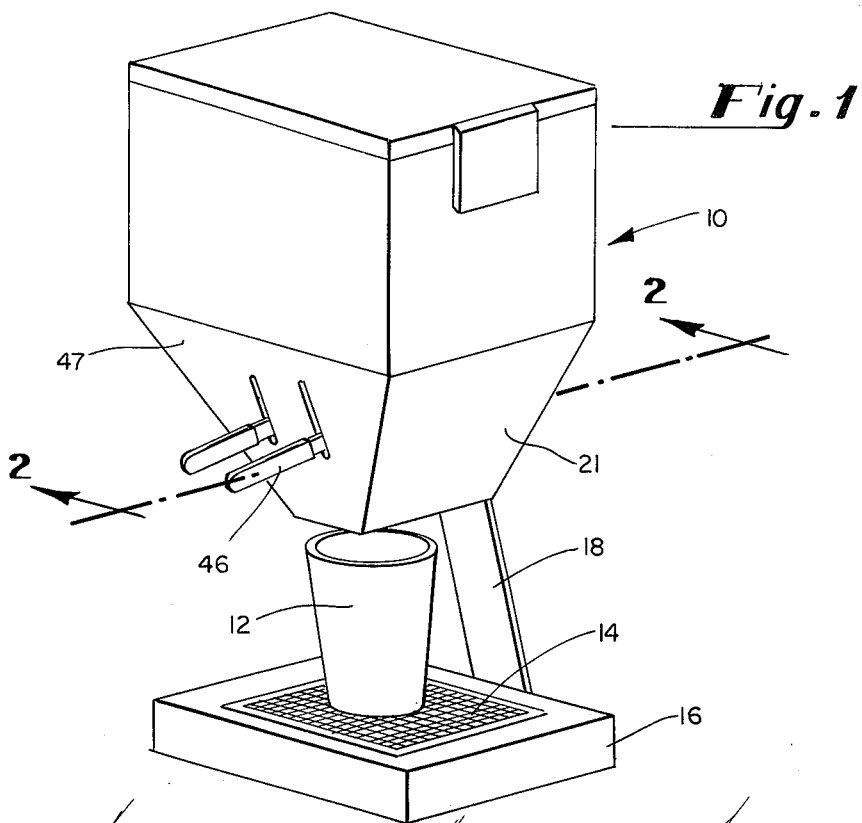
FIG. 1 is a perspective view taken from the front right side of the device embodying my invention, shown in its environmental relation to a cup.

Although specific forms of the invention have been selected for illustration in the drawings, and the following description is drawn in specific terms for the purpose of describing these forms of the invention, this description is not intended to limit the scope of the invention which is defined in the appended claims.

In FIG. 1 a dual dispenser, designated generally 10, in accordance with the preferred embodiment of my invention is shown in its environmental relation to a cup 12 positioned on the base of the dispenser. The base is provided with a screen 14 made of a suitable material which opens into a basin (not shown) in the solid base 16. A bracket 18 fixedly attached to the base extends upwardly to fixedly mount the dispenser 10 above the basin. Thus, the cup 12 can be readily inserted beneath the dispenser and can rest on the screen 14 to receive the sugar or powdered cream from the dispenser as will be more fully discussed hereinbelow.

The dispenser is shown in greater detail in the remaining three figures. It is provided with sloping inner walls as at 20 and 21 so that the particulate matter, such as granulated sugar, designated generally 22, will flow by gravity toward the bottom of the container. The upper portion of the dispenser 10 is a generally box-like container capable of holding perhaps five pounds of sugar, or more depending on the expected usage of the device.

The wall 20 has a further purpose in that it is the equivalent of an inverted weir for the moving of solid particulate material. The provision of such a weir prevents the particulate matter from "jackpotting" or free flowing out of the dispenser. Thus, a mound of sugar having the slope indicated at "A" in FIG. 2 will be formed within the container between a plunger 30 and an opening 50, but will not reach said opening.

The bottom portion of the container has an opening 23 in the front wall 24 which communicates with a cylindrical tube 26. The tube 26 opens at 50 to the atmosphere when the cover plate 28 is removed. This arrangement aids in maintaining the sanitary condition of the particulate matter.

The means for moving the particulate matter toward the openings exiting from the container comprises a piston 30 embraced within a sheath 32 made of resilient plastic material. Upon movement of the piston from the position shown in full lines in FIG. 2 to the position shown in phantom lines, the sheath 32 expands, all the while conforming to the longitudinally extending surfaces of the piston to form in effect an expanded piston of uniform cross section throughout shown in phantom lines and designated generally by the arrow "B" in FIG. 2. This expansible sheath overcomes the inherent friction of the packed particulate matter and permits the movement of the piston through the matter.

A boss 34 is fixedly attached through the back wall by any suitable means such as a nut and bolt designated generally 36. The expansible material from which the sheath 32 is made retained against the boss 34 and the plunger 30 by any suitable means, such as an adhesive, so as to be sealed thereto. Thus, as the piston expands, it is sealed from the particulate matter.

As a manual means of actuating the plunger, I have provided a stainless steel wire 40, which is fixedly attached within the plunger by any suitable means (not shown), so that when pulling on the wire the plunger 30 will move outwardly in the direction as shown by the phantom lined position, thereby stretching the sheath of plastic material 32; again as shown by the phantom lines at B. The other end of the wire is looped, as at 41, about a portion of a bell crank designated generally 42. The bell crank is pivotally mounted on the end of a shouldered standoff 44 by means of a spring clip 45. The lever arm 46 extends from one side of the bell crank through the front shield 47 of the device and is provided at its outer end with a suitable plastic cover.

Figure 2:
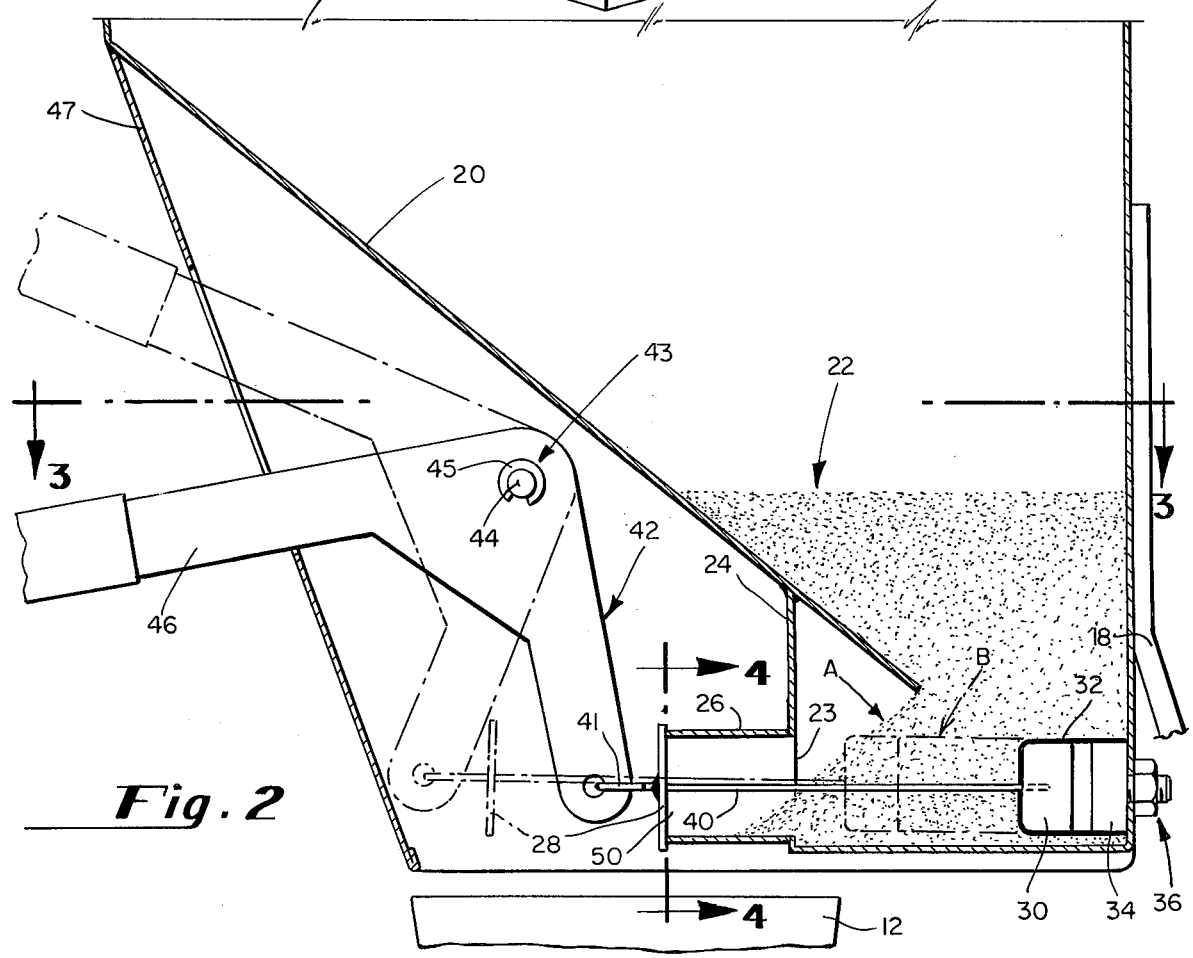
FIG. 2 is an enlarged section of the upper portion taken as indicated by the lines and arrows 2—2 in FIG. 1, with alternate positions shown in phantom lines.
Figure 3:
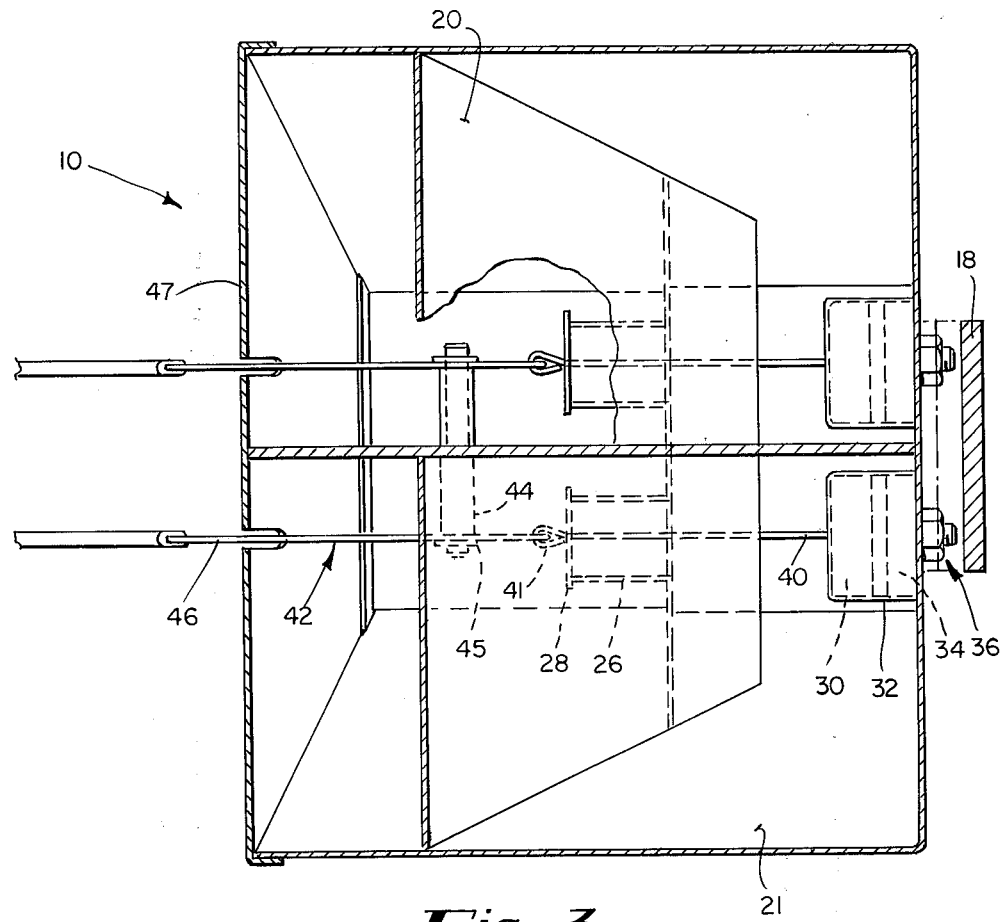
FIG. 3 is a reduced section taken as indicated by the lines and arrows 3—3 in FIG. 2, partially broken away with portions of the device shown in phantom lines.

When the lever 46 is raised from the position shown in full lines in FIG. 2 to the position shown in phantom lines, the bell crank withdraws the wire 40, thereby pulling on the plunger 30 and expanding the sheath, so that the plunger moves through the material with virtually no frictional resistance. In so doing, it causes the plunger to push a portion of the piled particulate matter into the cylindrical body 26. When the lever is released the plunger returns to the full line position shown in FIG. 2 in response to the inherent forces in the resilient material 32; which material attempts to return to its unstretched condition. The shield 28 is welded to the wire 40. The material 32 in the full line condition shown in FIG. 2 most preferably is slightly stretched, so that the plunger is pulled back fully and the cover plate 28 is held against the member 26 at the opening 50, positioning the plunger 32.

Figure 4:
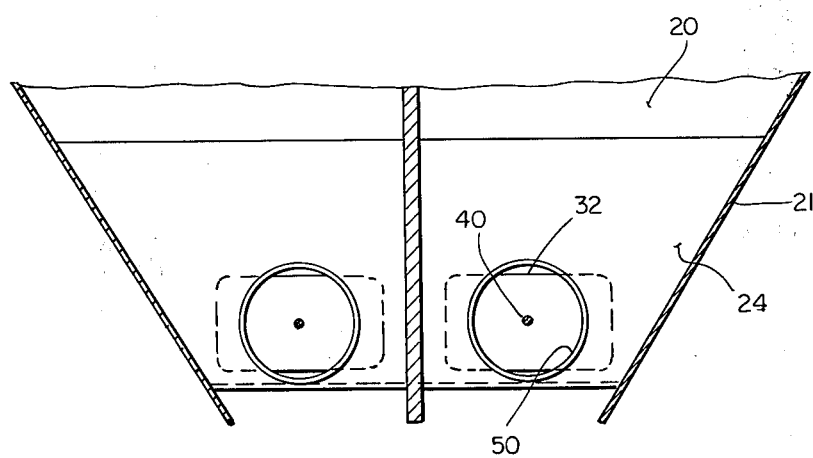
FIG. 4 is a section taken as indicated by the lines and arrows 4—4 in FIG. 2.

If the length of the tube 26 is such that the portion of the particulate matter which has been advanced by movement of the plunger will not be sufficient to exit through the opening 50 (shown more clearly in FIG. 4) then it may be necessary to pull the lever up again so that the plunger will advance a second portion of material, thereby forcing the first portion out through the opening 50. In either event, it will be noted that the construction provides a means whereby no particulate matter can inhibit the movement of the plunger, that is, there are no sliding parts which can become fouled by the particulate matter. The sheath 32 merely expands and contracts within the particulate matter, thus overcoming friction.

While no attempt has been made in presenting this description to identify specifically the dimensions involved, it will be understood by anyone skilled in the art that the positioning of the weir and the opening, the size of the plunger, the size of the container, and the size and length of the portion 26 can all be varied so that various amounts of particulate matter can be advanced or dispensed as is desired. For instance, these can be adjusted so that a single teaspoon of material will be dispensed upon each pull of the plunger. In this regard, it would be well to follow the approximate proportions shown in the drawings, wherein it will be noted that the plunger's cross section is small relative to its stroke. This, combined with the mechanical advantage of the bell crank, provides a manual dispenser requiring very little effort to move the plunger through the sugar.

With the dual unit shown, it is possible to dispense powdered cream from one side and sugar from the other, thereby making the unit a desirable adjunct to a commercial installation, such as a fresh brewed coffee machine.

The construction shown has proven to be workable even when left overnight, and indeed, the only noticeable attributes have been that the first advance of the plunger in the morning forces out a lump of sugar. Subsequent use will force the sugar out in granulated form. In this regard, it will be noted that the construction shown provides sharp edges which aid in breaking up the initial lump of sugar. Thus, the opening 23 formed in the wall 24 as shown in FIG. 2 tends to be an edge which will aid in crushing the initial lump of sugar formed along the slope designated "A" upon advancement of the plunger 30.

It will be understood that various changes in the details, materials and arrangement of parts which have been herein described and illustrated in order to explain the nature of this invention, may be made by those skilled in the art within the principle and scope of the invention as expressed in the following claims.

It will further be understood that the "Abstract of the Disclosure" set forth above is intended to provide a nonlegal technical statement of the contents of the disclosure in compliance with the Rules of Practice of the United States Patent Office, and is not intended to limit the scope of the invention described and claimed herein.

I claim:

1. An apparatus for dispensing particulate matter, comprising: a container forming a chamber for retaining said matter, having an opening therein through which said matter may be fed by gravity to a first position proximate to a discharge opening in said container; an expansible plunger means for moving through said particulate matter and displacing a portion of said matter toward said discharge opening, comprising a plunger juxtaposed to said opening in said chamber so that at least a portion of the matter in said first position will be between said plunger and said discharge opening and an expansible sheath engaging said plunger, said sheath having a portion thereof retained against movement relative to said plunger; and actuating means for moving said plunger and expanding said sheath through said matter in the direction of travel of said plunger, thereby forming an expanded piston defined by the envelope of said sheath which is conformed to the surfaces of the plunger which extend in the direction of travel of the plunger through said matter, as said plunger moves through said matter to dispense a portion of said matter from said container by moving a portion of said matter from said first position toward said discharge opening.

2. An apparatus for dispensing particulate matter, comprising: a container forming a chamber for retaining said matter, having an opening therein through which said matter may be fed by gravity to a first position proximate to a discharge opening in said container; an expansible plunger means for moving through said particulate matter and displacing a portion of said matter toward said discharge opening, comprising a plunger juxtaposed to said opening in said chamber so that at least a portion of the matter in said first position will be between said plunger and said discharge opening and an expansible sheath engaging said plunger, said sheath having a portion thereof retained against movement relative to said plunger; and actuating means for moving said plunger and expanding said sheath through said matter in the direction of travel of said plunger, thereby forming an expanded piston of uniform cross section defined by the envelope of said sheath as it moves through said matter to dispense a portion of said matter from said container by moving a portion of said matter from said first position toward said discharge opening.

* * * * *